United States Patent [19]

Kasiraj et al.

[11] Patent Number: 4,962,532
[45] Date of Patent: Oct. 9, 1990

[54] METHOD FOR PROVIDING NOTIFICATION OF CLASSIFIED ELECTRONIC MESSAGE DELIVERY RESTRICTION

[75] Inventors: Chander Kasiraj, Grapevine; Timothy J. Wolf, Bedford, both of Tex.

[73] Assignee: IBM Corporation, Armonk, N.Y.

[21] Appl. No.: 288,520

[22] Filed: Dec. 22, 1988

[51] Int. Cl.⁵ ............................................. H04L 9/00
[52] U.S. Cl. .................................... 380/25; 364/200
[58] Field of Search ...................... 380/23, 25; 364/200

[56] References Cited

U.S. PATENT DOCUMENTS

| 4,328,542 | 5/1982 | Anastas et al. | 364/200 |
| 4,439,830 | 3/1984 | Chueh | 364/200 |
| 4,672,572 | 6/1987 | Alsberg | 380/25 |
| 4,811,393 | 5/1989 | Hazard | 380/23 |
| 4,823,389 | 4/1989 | Wurzenberger | 380/25 |

Primary Examiner—Salvatore Cangialosi
Attorney, Agent, or Firm—Andrew J. Dillon

[57] ABSTRACT

A method is disclosed for notifying both the source and intended recipient of a classified electronic message transmitted via a computer network of a delivery restriction imposed by an insufficient classification level at the recipient's system. A required classification level is transmitted by the source of a classified electronic message in association with each classified electronic message in an indication of each classified electronic message is stored in an output log at the source system. Prior to permitting delivery of a classified electronic message, the required classification level is then compared to the classification level of the intended recipient. Delivery of a classified electronic message is automatically restricted in response to an insufficient classification level at the recipient's system and a status message is then transmitted to either or both the source and the intended recipient of the classified electronic message. In a preferred embodiment of the present invention, the recipient is automatically prompted to attempt to obtain a classification upgrade or forward the message to an alternate recipient in response to such restriction. Additionally, the method of the present invention permits an undelivered message to be destroyed by the source, the recipient, or the system in response to the failure of delivery.

8 Claims, 3 Drawing Sheets

METHOD FOR PROVIDING NOTIFICATION OF CLASSIFIED ELECTRONIC MESSAGE DELIVERY RESTRICTION

CROSS REFERENCE TO RELATED APPLICATION

This patent application is related to U.S. patent application Ser. No. 288,509, entitled "Method for Restricting Delivery and Receipt of Electronic Messages," filed of even date herewith by the inventors hereof and assigned to International Business Machines Corporation, Attorney Docket No. AT9-88-034.

BACKGROUND OF THE INVENTION

1. Technical Field

This invention relates generally to computer networks and in particular to methods for transmitting electronic messages via computer networks. Still more particularly, the present invention relates to methods for providing notification to both the source and recipient of classified electronic messages which are undeliverable due to classification restrictions.

2. Background Art

The electronic mail is rapidly supplanting Post Office mail as a means for communicating between individuals. One significant advantage of electronic mail is that the transmission time associated with each electronic mail message is ordinarily only seconds, or fractions of a second, as compared to Post Office mail which ordinarily requires several days.

The mailing time associated with Post Office mail often causes significant delay in the conduct of business and has been largely ignored, and consequently tolerated, until the advent of Express Mail services and electronic mail. Currently, this widespread delay of business is identified as "float" and the minimizing or eliminating of this float has become one goal of business managers, efficiency experts and others hoping to increase societal productivity.

The widespread utilization of electronic mail systems have given rise to a problem of security. That is, the worrisome problem of delivering a sensitive electronic mail message to the terminal of a third party only to have that message intercepted and read by another due to a lack of sufficient security at the recipient's terminal. Recently a method has been proposed whereby the delivery of a classified message will be automatically cancelled if the recipient's system profile does not match a pre-established profile which has been transmitted with the message. While this represents an enhancement over known electronic mail systems by providing a system with the ability to automatically proscribe the delivery of a classified message to a recipient whose recipient profile does not match the pre-established profile established by the source of the classified message, it does not address the problem of how to proceed once delivery of a classified message has been cancelled.

Thus, it should be obvious that a need exists for a method whereby the delivery and receipt of sensitive electronic messages may be carefully restricted and whereby the source and recipient of such electronic messages may receive notification indicating the delivery or non-delivery status of a classified message.

SUMMARY OF THE INVENTION

It is therefore one object of the present invention to provide an improved electronic message system.

It is another object of the present invention to provide an improved electronic message system which permits restriction of the delivery and receipt of classified electronic messages while providing a notification to both the source and recipient regarding the non-delivery of such messages.

It is yet another object of the present invention to provide an improved electronic message system which permits restriction of the delivery and receipt of classified electronic messages which may also provide notification to a designated third party in the event of such restriction.

The foregoing objects are achieved as is now described. In accordance with the method of the present invention, a required classification level is transmitted by the source of a classified electronic message in association with each classified electronic message and an indication of each such classified electronic message is stored in an output log at the source system. Prior to permitting delivery of a classified electronic message, the required classification level is then compared to the classification level of the intended recipient. Delivery of a classified electronic message is automatically restricted in response to an insufficient classification level at the recipient's system and a status message is then automatically transmitted to either or both the source and the intended recipient of the classified electronic message. A preferred embodiment of the present invention also provides for the transmittal of a status message to a designated third party, such as a system operator. In the disclosed embodiment of the present method, the receipt of a classified message bearing a classification higher than that of the intended recipient will cause the system to automatically prompt the intended recipient to attempt to obtain a classification upgrade or to forward the message to an alternate recipient bearing the proper classification level. Additionally, the method of the present invention permits an undelivered message to be destroyed by the source, the recipient or the system in response to the failure of delivery.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
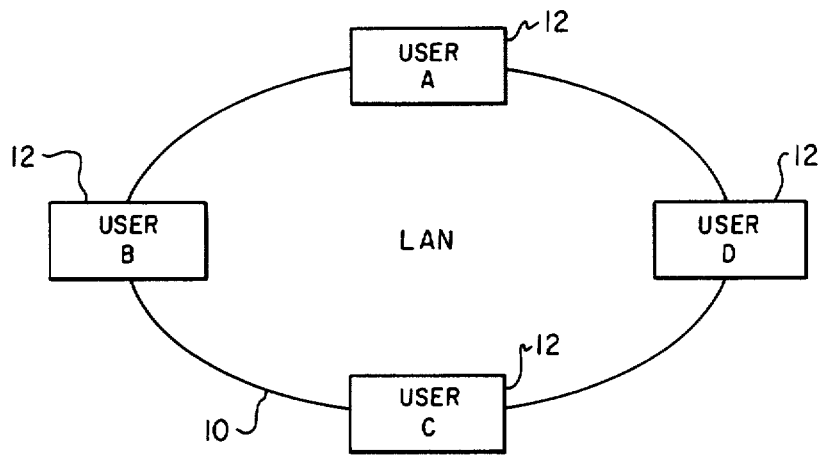
FIG. 1 depicts in block diagram form a Local Area Network (LAN) which links multiple users in a system wherein electronic messages may be transmitted.

With reference now to the figures and in particular with reference to FIG. 1, there is depicted a Local Area Network (LAN) 10 which is a self-contained computer network linking a plurality of users. As is illustrated, Users A, B, C, and D are each linked in Local Area Network (LAN) 10 and are capable of freely communicating electronic messages between one another within Local Area Network (LAN) 10. Those skilled in the art will appreciate that while a Local Area Network (LAN) 10 is depicted in FIG. 1, the electronic message method disclosed herein may be utilized with other such systems such as a plurality of interactive work stations which are each coupled to a host computer.

The method of the present invention permits a transmitter to transmit a classified electronic message to a particular recipient and automatically generate notification messages to the recipient, a designated third party, and the source system in the event that delivery of the classified electronic message is not accomplished due to an insufficient classification level at the recipient system. The method of the present invention may be characterized by a plurality of method steps, some of which may be characterized for purposes of exposition as occurring at a "transmission system" and some of which may be characterized for purposes of exposition as occurring at a "reception system."

Figure 2:
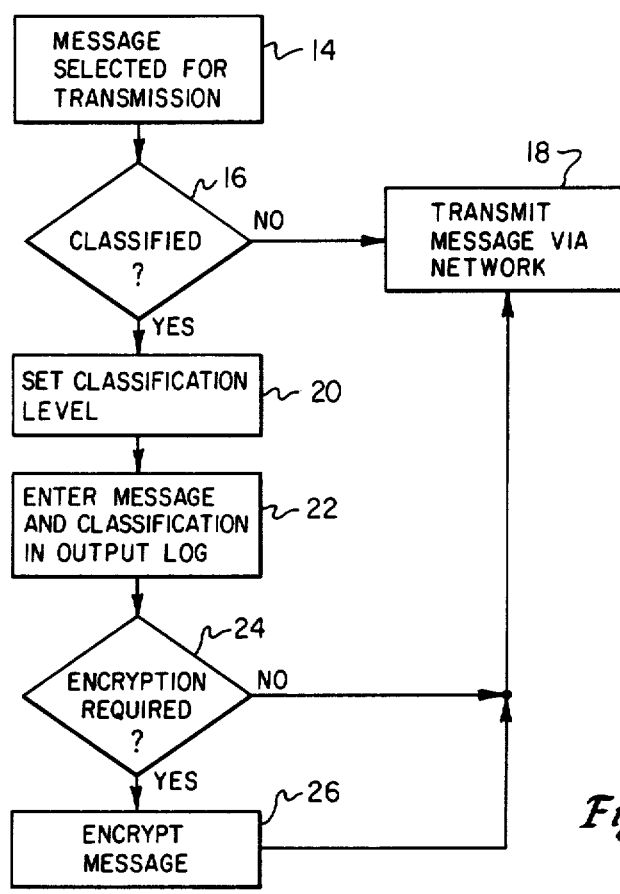
FIG. 2 depicts a logic flow chart illustrating the method steps of the present invention at the transmission system.
Figure 3A:
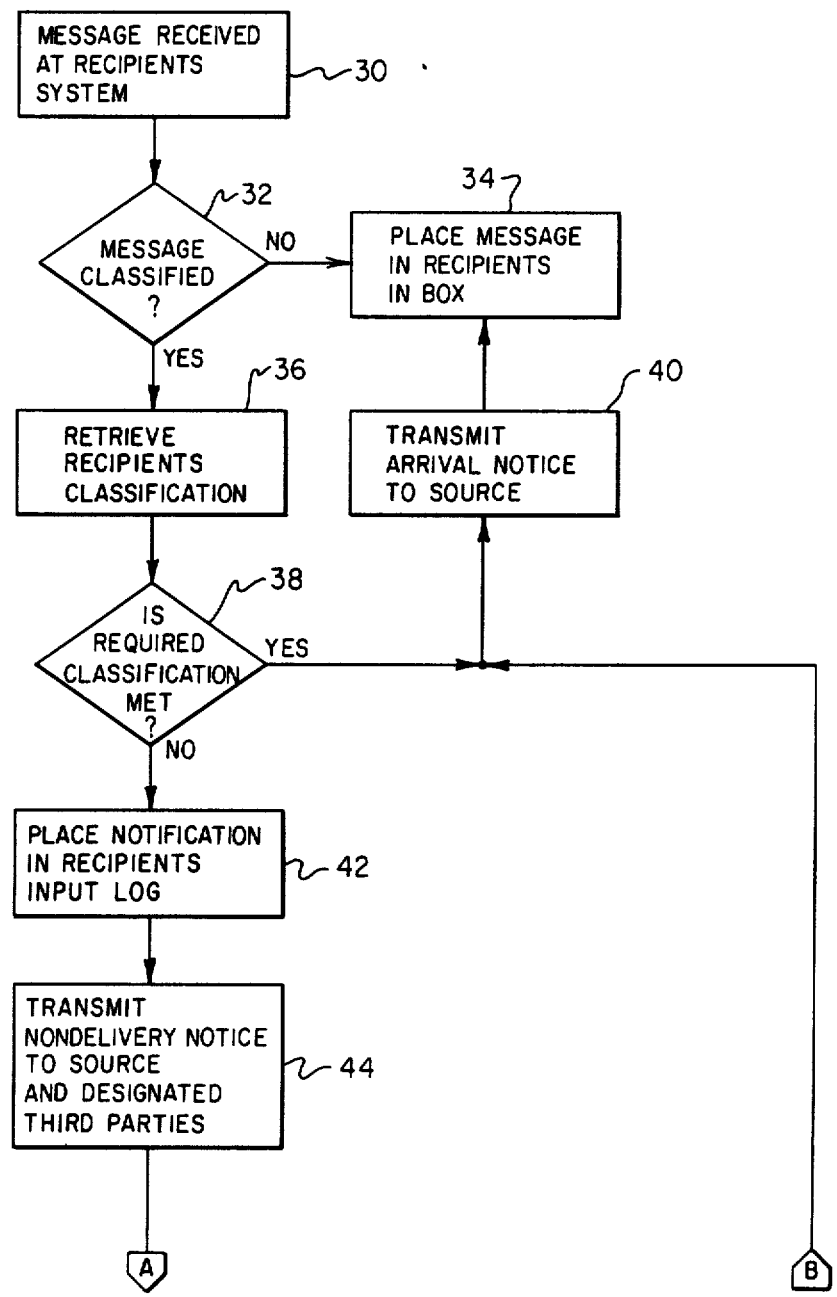
FIGS. 3A and 3B depict a logic flow chart illustrating the method steps of the present invention at the reception system.
Figure 3B:
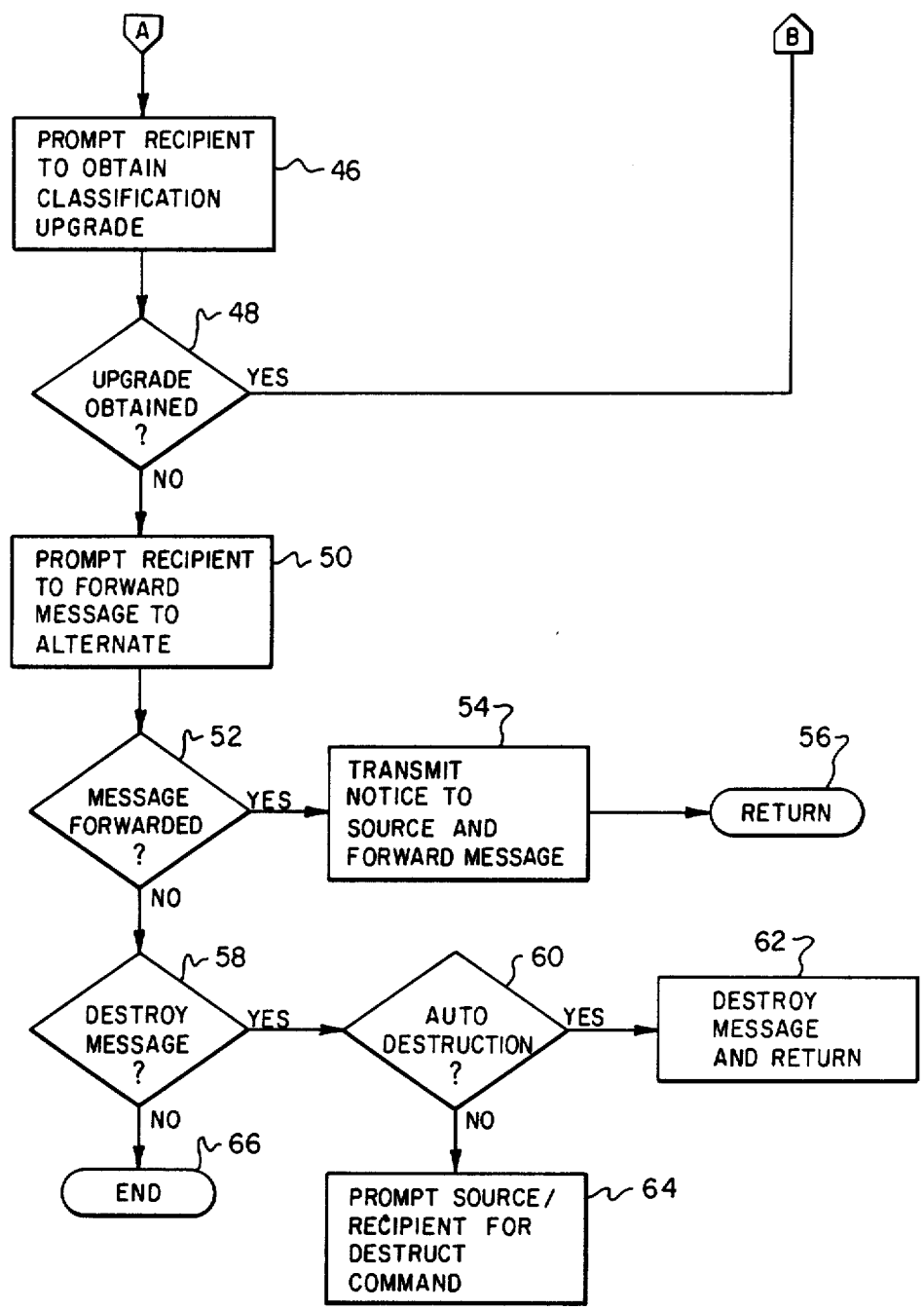

The transmission system method steps of one preferred embodiment of the present invention are depicted in logic flow chart form in FIG. 2 of the present application, while the reception system method steps of the same preferred embodiment are depicted in logic flow chart form in FIGS. 3A and 3B. FIG. 2 and FIGS. 3A and 3B should be read together to fully understand the preferred embodiment of the present method whereby notification of the inability of a recipient to receive a classified electronic message may be automatically transmitted to designated parties. Additionally, each user depicted in FIG. 1 may consist of an individual, or a computer system, such as a personal computer.

Referring now to FIG. 2, the method steps of the transmission system will now be described, with occasional reference to FIG. 1, for purpose of exposition. As depicted in block 14, the method of the present invention begins by the selection of an electronic message for transmission at the transmission system. Those skilled in the art will appreciate that the selection of a particular message for transmission involves not only the selection of the message content but also the specification of the recipient or recipients for that particular message. Therefore, the selection of a particular message for transmission, as depicted in block 14, shall be assumed to include such specifications. Next, block 16 is utilized to illustrate whether or not the message selected for transmission requires a particular classification level. If not, the particular message selected by block 14 is transmitted via Local Area Network (LAN) 10 (see FIG. 1) in a manner well known in the art, as illustrated in block 18.

In the event the electronic message selected for transmission as illustrated in block 14 requires a classification level, as depicted in block 16, then block 20 illustrates the setting of a particular classification level. Those skilled in the art of electronic message systems will appreciate that each individual establishment may generate its own classification level system and that such systems may differ in the number and priority of classifications which are available. Next, an indication of the message and the classification level selected is entered in the output log for the transmission system, as illustrated in block 22. Thereafter, block 24 is utilized to determine whether or not encryption is required. If no encryption is desired, the message is transmitted via the network, as illustrated in block 18. If, however, encryption is required, then block 26 illustrates the encryption of the classified electronic message, by any technique known in the prior art, prior to transmission of the message via the network, as illustrated in block 18.

With reference now to FIGS. 3A and 3B, there are depicted the method steps of the present invention which take place at the recipient's system. The method of the present invention begins at the recipient's system with the receipt of a particular message, as illustrated in block 30. Next, block 32 is utilized to determine whether or not the electronic message received in block 30 is classified. If the message received is not classified, the message is then placed in the recipient's in box, as illustrated in block 34.

In the event the electronic message received at the recipient's system is classified, then block 36 depicts the retrieval of the recipient's classification, which, in a preferred embodiment of the present invention, is stored within a recipient profile associated with each recipient within the network.

Next, block 38 illustrates a determination of whether or not the classification level required by the message received at the recipient's system is met by the recipient's classification level. If the recipient possesses a suitable classification level to receive the classified electronic message, then block 40 illustrates the transmittal of an arrival notice back to the source of the classified message and the placing of the message into the recipient's in box, as illustrated in block 34.

In the event the recipient's classification level is not sufficiently high to receive the classified electronic message received at the recipient's system, then block 42 illustrates the placing of a denial notification in the recipient's input log. Of course, those skilled in the art will appreciate that such a denial notification may be carefully crafted to indicate to the recipient that a classified electronic message has arrived for which the recipient does not possess a sufficiently high classification level. This may be done simply and easily without indicating the nature of the classified electronic message.

Next, block 44 depicts the transmittal of a non-delivery notice to the source and any designated third parties. One important feature of the method of the present invention is that the notification of non-delivery which is automatically generated for the source of the classified electronic message may also be directed automatically to the system operator or any other designated third party. In this manner, the system may establish suitable techniques for dealing with undelivered classified electronic message which are unique to a particular system without the necessity of requiring that all systems utilizing this method treat undelivered classified electronic messages in the same manner.

As illustrated in block 46, the method of the present invention next prompts the recipient to obtain a classification upgrade. In this manner, the recipient may request and often receive a temporary or transactional classification upgrade in order to allow him to receive and review a particular classified electronic message. Block 48 then illustrates a determination of whether or not the upgrade has been obtained and, if so, block 40 illustrates the transmittal of an arrival notice to the source. Next, the classified electronic message is placed in the recipient's in box, as depicted in block 34.

In the event the recipient has not obtained a classification upgrade suitable to permit him to review the classified electronic message received, then block 50 illustrates the prompting of the recipient to forward the message to an alternate recipient. For example, the recipient may not posses a suitable classification level; however, his manager may have such a classification level and forwarding of the classified electronic message to the manager will permit communication with the intended recipient to take place to the extent the manager deems it necessary.

Block 52 now illustrates a determination of whether or not the classified electronic message has been forwarded to an alternate recipient. If so, block 54 illustrates a transmittal of a notice to the source of the classified electronic message indicating that the classified electronic message has been forwarded to an alternate recipient. Thereafter, the process returns, as illustrated in block 56, to determine whether or not the alternate recipient designated by the initial recipient possesses a sufficient classification level to receive the message, as illustrated above.

In the event the recipient has declined to forward the classified electronic message to an alternate recipient, as determined by block 52, then block 58 is utilized to determine whether or not the classified electronic message should be destroyed. In the event destruction of the classified electronic message is desired, block 60 may be utilized to determine whether or not the system protocols require automatic destruction of an undelivered classified electronic message. If so, then block 62 illustrates the destruction of the classified electronic message and a return to processing. If automatic destruction of a classified electronic message is not desired, then block 64 illustrates the prompting of the source or recipient for a destruct command. In this manner, the classified electronic message which may not be delivered can be destroyed. Finally, in the event block 58 determines that it is not necessary to destroy the classified electronic message, the process ends.

As those skilled in the art will appreciate upon reference to the foregoing specification, by utilizing the method of the present invention the Applicants have provided a technique whereby the non-delivery of a classified electronic message due to the inability of the recipient to provide a suitable classification level may automatically generate a notification which will be transmitted to the source of the classified electronic message, as well as to any designated third party within the system. In this manner, users of this method may customize a protocol for handling classified electronic messages within a individual system which may accommodate almost any variation in techniques for handling the delivery or non-delivery of classified electronic messages.

While the invention has been particularly shown and described with reference to a preferred embodiment, it will be understood by those skilled in the art that various changes in form and detail may be made therein without departing from the spirit and scope of the invention.

What is claimed:

1. A method for notifying the source of a classified electronic message transmitted via a computer network of a delivery restriction imposed by the classification level of the recipient, comprising the steps of:

transmitting a required classification level in association with an electronic message to a selected recipient via a computer network;

comparing said transmitted required classification level with the classification level of said selected recipient;

automatically restricting delivery of said electronic message to said selected recipient in response to the failure of said classification level of said selected recipient to meet or exceed said transmitted required classification level; and automatically transmitting the status of said delivery to said source.

2. The method for notifying the source of a classified electronic message transmitted via a computer network of a delivery restriction imposed by the classification level of the recipient according to claim 1 further including the step of storing an indication of each transmitted electronic message along with said required classification level at said source.

3. The method for notifying the source of a classified electronic message transmitted via a computer network of a delivery restriction imposed by the classification level of the recipient according to claim 2 further including the step of storing said transmitted status in association with said stored indication of each transmitted electronic message.

4. The method for notifying the source of a classified electronic message transmitted via a computer network of a delivery restriction imposed by the classification level of the recipient according to claim 1 further including the step of automatically transmitting a notification of said delivery restriction to said selected recipient in response to said automatic restriction of delivery.

5. The method for notifying the source of a classified electronic message transmitted via a computer network of a delivery restriction imposed by the classification level of the recipient according to claim 4 further including the step of prompting said selected recipient to request an increased classification level in response to said automatic restriction of delivery.

6. The method for notifying the source of a classified electronic message transmitted via a computer network of a delivery restriction imposed by the classification level of the recipient according to claim 1 further including the step of prompting said source to dispose of said electronic message in response to said automatic restriction of delivery.

7. The method for notifying the source of a classified electronic message transmitted via a computer network of a delivery restriction imposed by the classification level of the recipient according to claim 1 further including the step of automatically disposing of said electronic message in response to said automatic restriction of delivery.

8. The method for notifying the source of a classified electronic message transmitted via a computer network of a delivery restriction imposed by the classification level of the recipient according to claim 4 further including the step of prompting said selected recipient to request transmittal of said electronic message to an alternate recipient in response to said automatic restriction of delivery.

* * * * *